(12) United States Patent
Maximov

(10) Patent No.: US 8,772,998 B2
(45) Date of Patent: Jul. 8, 2014

(54) ELECTRIC MACHINE

(75) Inventor: Andrei Mikhailovich Maximov, Omsk (RU)

(73) Assignees: Andrei Mikhailovich Maximov, Omsk (RU); Svetlana Nikolaevna Filonenko, Omsk (RU); Evgeny Petrovich Krivoruchko, Omsk (RU); Andrey Antonovich Plemenuyk, Omsk (RU)

( * ) Notice: Subject to any disclaimer, the term of this patent is extended or adjusted under 35 U.S.C. 154(b) by 0 days.

(21) Appl. No.: 13/170,692

(22) Filed: Jun. 28, 2011

(65) Prior Publication Data

US 2012/0086294 A1 Apr. 12, 2012
US 2012/0187791 A2 Jul. 26, 2012

Related U.S. Application Data

(63) Continuation of application No. PCT/RU2009/000724, filed on Dec. 25, 2009.

(30) Foreign Application Priority Data

Dec. 29, 2008 (RU) ................................ 2008152465

(51) Int. Cl.
*H02K 1/14* (2006.01)
*H02K 1/08* (2006.01)
*H02K 1/06* (2006.01)
*H02K 21/00* (2006.01)

(52) U.S. Cl.
USPC .......... 310/216.021; 310/254.1; 310/216.022; 310/216.111; 310/216.012; 310/216.097; 310/156.01

(58) Field of Classification Search
USPC ........... 310/254.1, 216.021–216.023, 156.01, 310/216.033–216.036, 216.097, 310/216.111–216.112
See application file for complete search history.

(56) References Cited

U.S. PATENT DOCUMENTS 4,080,724 A * 3/1978 Gillette ........................... 29/598
4,700,097 A * 10/1987 Kawada et al. ............... 310/162
(Continued)

FOREIGN PATENT DOCUMENTS

JP 2000050610 A 2/2000
RU 2351053 C2 3/2009
(Continued)

OTHER PUBLICATIONS

International Search Report, mailed May 27, 2010 from PCT/RU2009/000724, filed Dec. 25, 2009.

*Primary Examiner* — Burton Mullins
(74) *Attorney, Agent, or Firm* — Patentbar International, P.C.

(57) ABSTRACT

The device comprises a single circular row of permanent magnetic poles and a circular row of electromagnets, magnetic-force-conducting elements of which have central polar part and two lateral polar parts connected to the central polar part and spaced from opposing (in the direction which is essentially perpendicular to the rotation axis) sides of the central polar part. Winding is situated upon central polar part. The part of winding positioned between the polar parts of the magnetic-force-conducting element is more than half the length of the whole winding. Central polar part may have at least one groove. The distance between the centers of adjacent polar surfaces of the magnetic-force-conducting element is set depending on the angle between the magnetic poles in the circular row. The angular dimension of the polar surface of the lateral polar part depends on the angular dimension of the polar surface of the central polar part.

6 Claims, 9 Drawing Sheets

(56) References Cited

U.S. PATENT DOCUMENTS

| | | | |
|---|---|---|---|
| 4,837,474 A | * | 6/1989 | Petersen et al. ........ 310/216.021 |
| 5,844,341 A | * | 12/1998 | Spooner et al. ............... 310/112 |
| 6,710,502 B2 | | 3/2004 | Maslov et al. |
| 6,727,630 B1 | | 4/2004 | Maslov et al. |

FOREIGN PATENT DOCUMENTS

| | | |
|---|---|---|
| RU | 2351054 C2 | 3/2009 |
| WO | 03030333 A2 | 10/2003 |
| WO | 2006115071 A1 | 11/2006 |

* cited by examiner

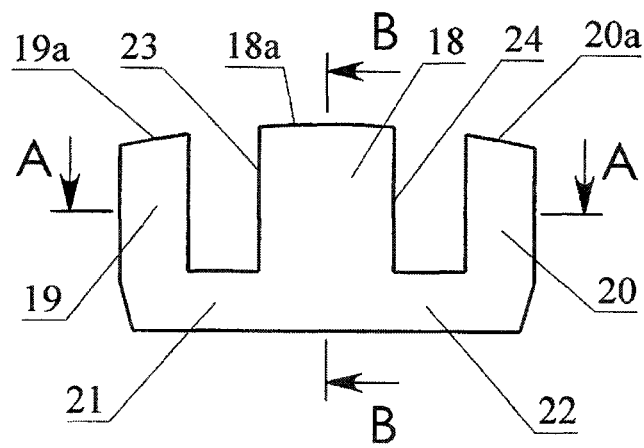
FIG 10a
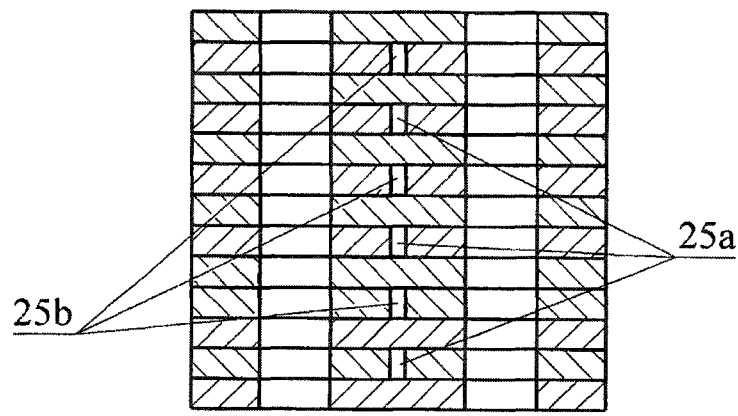
FIG 10b
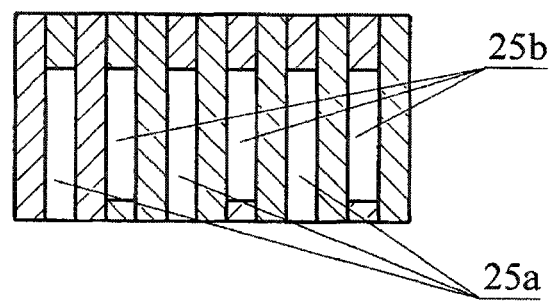
FIG 10c
FIG 10

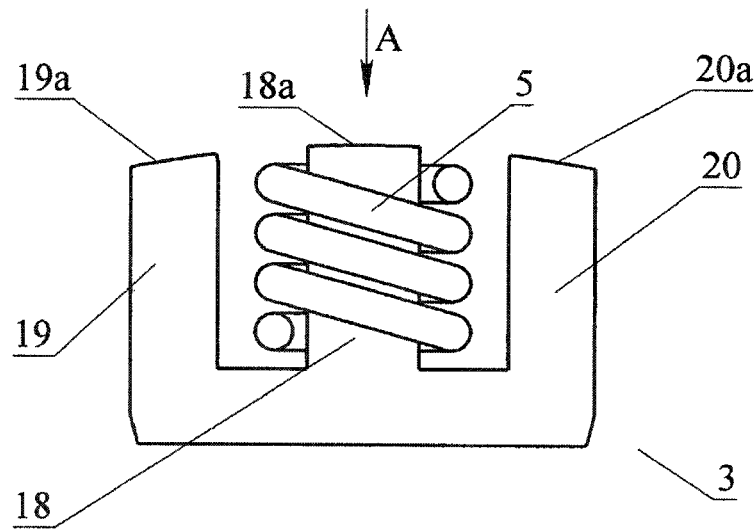
FIG 11a
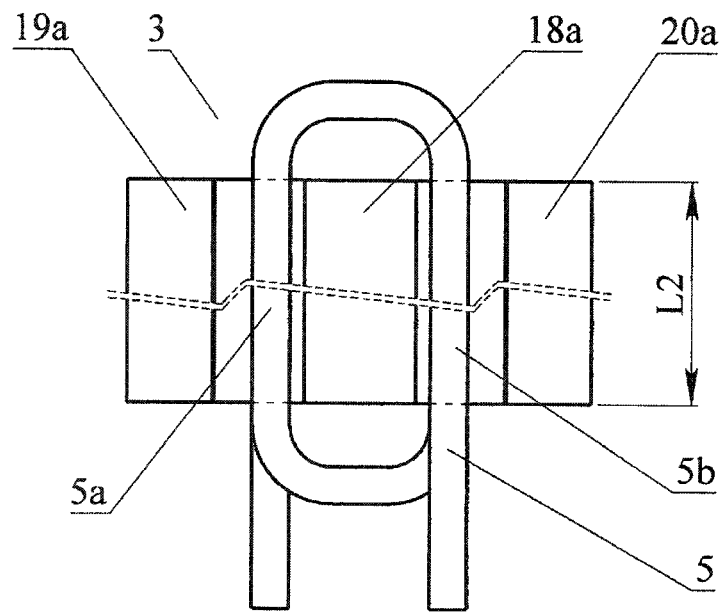
FIG 11b
FIG 11

ELECTRIC MACHINE

RELATED APPLICATIONS

This application is a continuation application of PCT application serial number PCT/RU2009/000724, filed on Dec. 25, 2009, which is incorporated herein by reference in its entirety, which, in turn, claims priority to Russian Patent Application No. RU 2008152465, filed on Dec. 29, 2008, which is incorporated herein by reference in its entirety.

FIELD OF THE INVENTION

This invention relates to electrical engineering and is concerned with the design philosophy of electric machines such as generators or motors which can be used, for example, as vehicle drives.

BACKGROUND OF THE INVENTION

International application WO 03030333 (published 4 Oct. 2003) describes an electric motor consisting of a rotor that includes two circular rows of permanent magnets and a stator that contains a circular row of separated from each other electromagnets. Each magnetic-force-conducting element of the electromagnet has two polar parts connected with a linking piece and spaced with respect to each other along the rotational axis. The winding of the electromagnet is positioned on the linking piece of the magnetic-force-conducting element.

From U.S. Pat. No. 6,727,630 (published 27 Apr. 2004) an electric motor is known which consists of a rotor that includes a circular row of permanent magnets and of a stator that contains a circular row of spaced electromagnets. Each magnetic-force-conducting element of the electromagnet has two polar parts coupled with a linking piece and separated from each other in a peripheral direction. The winding of the electromagnet is made of two coils positioned on the polar parts of the magnetic-force-conducting element.

Patent application JP 2000050610 (published 18 Feb. 2000) describes an electric motor that consists of a rotor that includes a circular row of permanents magnetic poles and a stator that contains a circular row of spaced electromagnets. Each magnetic-force-conducting element of the electromagnet has two polar parts connected with a linking piece and spaced with respect to each other in the direction peripheral with regard to the rotational axis. The winding of the electromagnet is positioned on the linking piece.

The general flaw of electric motors described in WO 03030333, U.S. Pat. No. 6,727,630 and JP 2000050610 is that the part of the winding responsible for generating the magnetomotive force and positioned between the polar parts of the magnetic-force-conducting element is less than half the length of the whole winding. This increases heat losses in the winding and makes it impossible either to increase the torque without increasing the magnetomotive force or to increase the magnetomotive force without increasing heat losses in the windings.

International application WO2006115071 (published 2 Nov. 2006) describes an electric motor that contains a rotor including a number of circularly distributed pairs of permanent magnets and a stator including a circular row of spaced electromagnets. The permanent magnets in each pair are placed next to each other so that their pole surfaces face each other with the same magnetic polarity and cross the peripheral direction. All polar surfaces of the magnetic-force-conducting element belong to one plane which is parallel to the rotational axis. The circular row of electromagnets embraces the circular row of the pairs of permanent magnets. The winding of the electromagnet is positioned upon the central polar part of the magnetic-force-conducting element. Compared to the electric motors described above, the drawback of this electric motor is low torque accompanied by high heat losses in the windings, which is accounted for by the magnetic reluctance of the gap between the polar parts and the magnetic poles. Another flaw of this design is a discrete type of rotation, the principle of which is based on the repulsion of facing each other magnetic poles from the polar surfaces of the central polar part. Besides, this electric motor cannot be manufactured so that the circular row of the pairs of the permanent magnets embraces the circular row of the electromagnets.

We chose an electric motor known from U.S. Pat. No. 6,710,502 (published 23 Mar. 2004) as a prototype. This electric motor contains a rotor including three circular rows of permanent magnets connected into a magnetic circuit and a stator including a circular row of spaced electromagnets. Each magnetic-force-conducting element of the electromagnet has a central polar part and two lateral polar parts connected with the central polar part and spaced from the opposite sides of the central polar part along the rotational axis.

The angular dimensions of the polar surfaces of the polar parts are essentially the same. The winding of the electromagnet consists of two coils, positioned on the linking pieces of the magnetic-force-conducting element.

The drawback of the existing engineering solution is placing the windings on the linking pieces of the magnetic-force-conducting element as well as the fact that the lateral polar parts are spaced from the opposite sides of the central polar part along the rotational axis. This makes it impossible to increase the torque without increasing the magnetomotive force of the windings and, accordingly, either increasing heat losses in the windings while keeping their mass the same or increasing the mass of the windings while keeping the level of heat losses the same. Moreover, in the existing engineering solution the lateral polar parts are spaced from the opposite sides of the central polar part along the rotational axis, which does not allow one to optimize magnetic fluxes in the magnetic-force-conducting element in order to increase the torque by varying the distance between the centers of the polar surfaces.

SUMMARY OF THE INVENTION

The invention is basically aimed at eliminating the above-mentioned drawbacks and creating a new high-efficiency electric machine with increased torque and capacity and smaller machine mass and heat losses in the windings.

The following definitions are used for the purposes of the present invention:

A magnetic pole is a radial-gap-facing surface of a respective piece of magnetic material with non-zero magnetization component normal to the respective surface.

The angular dimension of a surface is the value of the angle between two planes intersecting along the rotational axis which are tangential with respect to peripherally opposing sides of the surface.

The angle between magnetic poles is understood to be the angle between two planes intersecting along the rotational axis one of which passes through the center of a magnetic pole while the other passes through the center of an adjacent magnetic pole.

The angle between polar surfaces is meant to be the angle between two planes intersecting along the rotational axis one of which passes through the center of the polar surface of a central polar part while the other passes through the center of the polar surface of a lateral polar part.

The circular row of elements is defined to be an arrangement in which the elements are placed sequentially one after another around of rotational axis.

The term "approximately" hereinafter means "the same" with technological tolerances as defined by the manufacturing standards of the machine parts.

Achieving the goal of this invention is facilitated by the design of an electric machine that comprises the first and the second parts separated by a radial gap and placed coaxially, with one of them embracing the other while:

the first and the second parts are mounted so that one of them can rotate with the other remaining still (stationary);

the first part comprises magnetic poles connected into magnetic circuit and distributed so that the polarity alternates within a given number of circular rows;

the second part comprises electromagnets positioned separate from each other in a circular row on the non-ferromagnetic substructure each magnetic-force-conducting element of the electromagnet comprises a central polar part and two lateral polar parts connected to the central polar part and spaced from opposing (in a given direction with respect to the rotational axis) sides of the central polar part by a defined distance between the centers of the adjacent polar surfaces;

each polar part of a magnetic-force-conducting element comprises a polar surface facing the radial gap;

the winding of an electromagnet is positioned on the magnetic-force-conducting element so that part of the winding is between the polar parts of the magnetic-force-conducting element and consists of two segments, one of which is positioned between the central polar part and one of the lateral polar parts and the other between the central polar part and the other lateral polar part;

the angle between magnetic poles is essentially the same for each pair of adjacent magnetic poles;

the angular dimension of the polar surface of the central polar part is chosen depending on the angular dimension of the magnetic pole;

the angular dimensions of the polar surfaces of the lateral polar parts are substantially the same In addition to that an electric machine comprises general and particular distinctive features:

the magnetic poles are positioned in a single circular row;

the given direction (with respect to the rotational axis) in which relevant sides of the central polar part (those from which connected to it lateral polar parts are spaced) are opposing each other is essentially the same as the direction perpendicular to the rotational axis, and the winding being positioned on the central polar part.

It is advisable that the part of the winding positioned between the polar parts of a magnetic-force-conducting element is more than half the length of the whole winding.

Preferably, the piece of magnetic material is made of hard-magnetic material, with the being a permanent magnet and all the above-mentioned pieces of magnetic material being positioned on a circular magnetic conductor and the magnetic circuit includes the permanent magnets and the circular magnetic conductor.

It is possible that soft-magnetic material is chosen for the above-mentioned piece of magnetic material. In this case each piece of magnetic material is positioned between two permanent magnets facing it with the magnetic poles of the same polarity. Then one permanent magnet is positioned between every two adjacent pieces of magnetic material, and the magnetic circuit includes all the above-mentioned pieces of magnetic material and the permanent magnets.

Besides, it is also possible that the above-mentioned piece of magnetic material is made of soft-magnetic material, and each piece of magnetic material is enveloped with a DC field coil. While all the pieces of magnetic material are positioned on a circular magnetic conductor and the magnetic circuit includes all pieces of magnetic material and the circular magnetic conductor. In this case it is preferable that all the above-mentioned pieces of magnetic material and the circular magnetic conductor are a single part.

The central polar part can be made with at least one groove.

It is advisable to form the groove so that the magnetic flux generated by the winding segment positioned between the polar parts of the magnetic-force-conducting element when passing through the polar surface of the central polar part is essentially the same as when passing through the polar surface of a lateral polar part.

It is possible that the groove is made as a reach-through hole in the direction coinciding with the rotational axis.

Preferably, the groove is made as a cutout, which reaches through in the direction of the rotational axis and is open from the side opposing the polar surface of the central polar part.

It is advisable that the magnetic flux generated by the winding segment positioned between the polar parts of the magnetic-force-conducting element magnetizes essentially the polar surfaces of the polar parts it is positioned between.

It is advisable that the distance between the centers of adjacent polar surfaces is given depending on the value of the angle between the magnetic poles in a circular row.

It is advisable that that the distance between the centers of adjacent polar surfaces is given so that the angle between the polar surfaces, is not less than approximately 0.7 times an angle between the magnetic poles and is not greater than approximately 1.3 of the angle between the magnetic poles.

If the magnetic pole of the first part is the surface of a piece of magnetic material is made of hard-magnetic material, the angle between the polar surfaces is not less than approximately 0.7 times an angle between the magnetic poles and is not greater than approximately 1.1 of the angle between the magnetic poles If the magnetic pole of the first part is the surface of a piece of magnetic material is made of soft-magnetic material, the angle between the polar surfaces is not less than approximately 0.9 times an angle between the magnetic poles and is not greater than approximately 1.3 of the angle between the magnetic poles It is advisable that the angular dimension of the polar surface of the lateral polar part is given depending on the angular dimension of the polar surface of the central polar part.

Preferably, the angular dimension of the polar surface of the lateral polar part is not less than approximately 0.55 times the angular dimensions of the polar surfaces of the central polar parts and is not greater than approximately 0.95 times the angular dimensions of the polar surfaces of the central polar parts The angular dimension of the polar surface of the central polar part is not less than approximately 0.55 times the angular dimensions of the magnetic poles and is not greater than approximately 0.95 times the angular dimensions of the magnetic poles.

If the central polar part is made with a groove, the angular dimension of the polar surface of the central polar part is not less than approximately 0.7 times the angular dimensions of the magnetic poles and is not greater than approximately 0.95 times the angular dimensions of the magnetic poles.

If the central polar part is made without a groove, the angular dimension of the polar surface of the central polar part is not less than approximately 0.55 times the angular dimensions of the magnetic poles and is not greater than approximately 0.80 times the angular dimensions of the magnetic poles.

In addition to this, centers of the polar surfaces of all the magnetic-force-conducting elements are substantially positioned on a single circle.

BRIEF DESCRIPTION OF THE DRAWINGS

The present invention is described in greater detail by its various embodiments with a reference to the drawings attached.

FIG. 10 shows schematically the views of the magnetic-force-conducting element with several grooves: FIG. 10a—the view in a plane perpendicular to the rotational axis, FIG. 10b—the sectional view along the A-A line as shown in FIG. 10a, FIG. 10c—the sectional view along the B-B line as shown in FIG. 10a.

FIG. 11 gives a schematic view of the electromagnet: FIG. 11a—the view in a plane perpendicular to the rotational axis; FIG. 11b—the view as indicated by arrow A as shown in FIG. 11a.

DETAILED DESCRIPTION OF THE PREFERRED EMBODIMENTS

Figure 1:
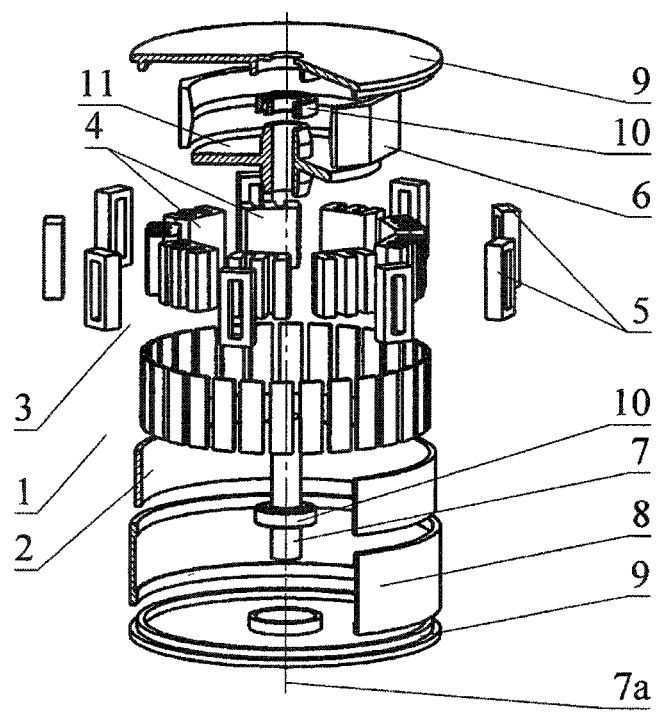
FIG. 1 is a schematic axonometric drawing of the main elements of the electric machine offset for clarity.

In what follows, preferred embodiments of the present invention are given with a reference to the drawings attached.

Identical or similar elements of the device are denoted in the drawings with the same position numbers.

With a reference to FIGS. 1-8, a detailed description is given of the design of the electric machine in its first embodiment.

The notation in FIG. 1 is as follows:
1 permanent magnets
2 circular magnetic conductor
3 electromagnets
4 magnetic-force-conducting elements of electromagnets 3
5 windings of electromagnets 3
6 substructure
7 shaft (with 7a being the rotational axis)
8 case element
9 lateral support elements
10 bearings
11 auxiliary element For the purposes of the present invention magnetic-force-conducting element 4 is the magnetic conductor (core) of the electromagnet.

Figure 2:
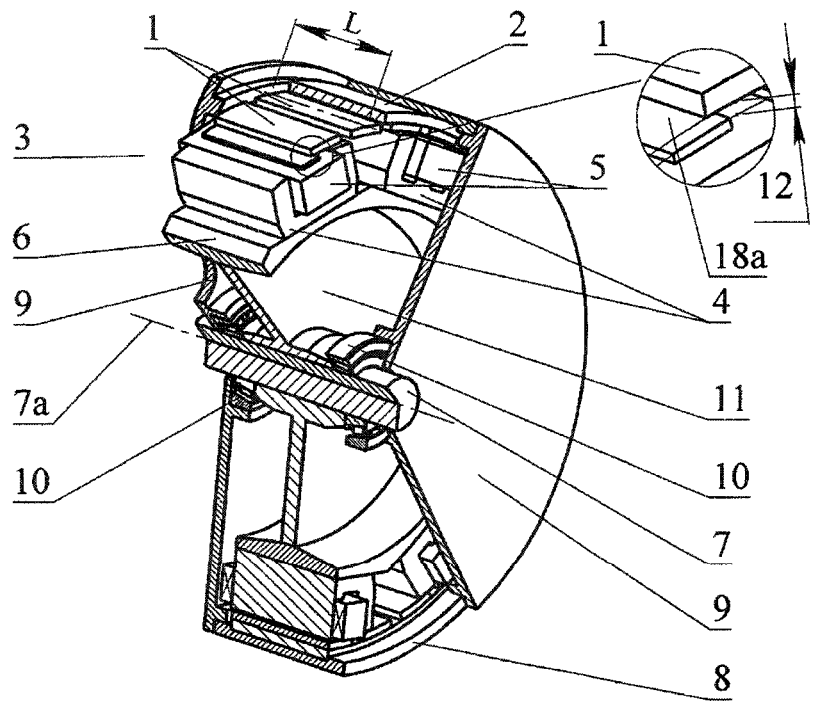
FIG. 2 gives an axonometric view of the first embodiment of the invention with case element and a shaft.

As shown in FIG. 2, cylindrical case element 8, made of non-ferromagnetic material, embraces rigidly bound to it circular magnetic conductor 2, made of ferromagnetic material. Circular magnetic conductor 2 embraces substructure 6, which is made of non-ferromagnetic material, e.g. aluminum-based alloys. Substructure 6 embraces shaft 7 and is rigidly bound to it with auxiliary element 11. Substructure 6 and auxiliary element 11 can be a single part (not shown).

Permanent magnets 1 are positioned on the inner surface of circular magnetic conductor 2, while magnetic-force-conducting elements 4 of electromagnets 3 are positioned on the outer surface of substructure 6 and are rigidly bound to it.

For the purposes of the present invention, permanent magnets 1 and circular magnetic conductor 2 are ascribed to the first part of the electric machine, and electromagnets 3 and substructure 6 to its second part.

The first and second parts are mounted coaxially so that one part can turn round rotational axis 7a with the other part remaining stationary. The first part in this design embraces the second part.

Permanent magnets 1 are positioned in a single circular row around rotational axis 7a.

Electromagnets 3 are separated from each other and positioned in one circular row around rotational axis 7a.

The circular row of permanent magnets 1 embraces the circular row of electromagnets 3 and is separated from it by radial gap 12.

Case element 8 is rigidly bound to lateral support elements 9, situated on its butt sides, which are, in turn, attached to shaft 7 with rolling bearings 10. One of lateral support elements 9 can be made bodily with case element 8 (not shown).

Permanent magnets 1, rigidly bound to circular magnetic conductor 2, are premagnetized pieces of magnetic material made of hard-magnetic material. One of the poles of each permanent magnet 1 is facing magnetic-force-conducting element 2, while the other is turned towards radial gap 12.

The surface of permanent magnet 1 turned towards radial gap 12 is a magnetic pole of the first part in its first implementation.

Figure 3:
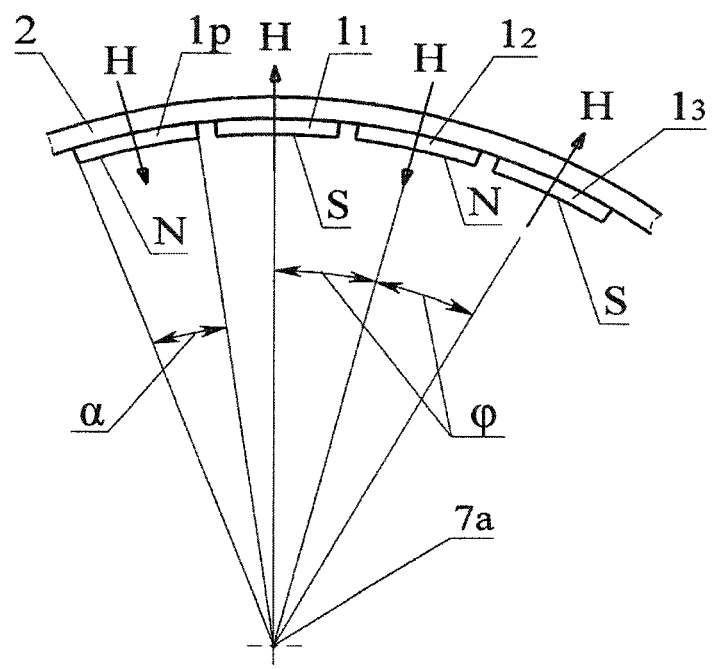
FIG. 3 schematically shows the cross-section of a fragment of the first part in its first implementation in a plane perpendicular to the rotational axis.

The direction of the magnetization vector, which defines the polarity of a magnetic pole, is alternating in a circular row consisting of p magnetic poles, as shown with arrows H in FIG. 3, e.g. for magnets $1_1, 1_2, 1_3$ and $1_p$. The magnetic poles of the first part of the corresponding polarity are denoted as N and S.

The length of a magnetic pole in the axial direction, as measured along the line of intersection of the magnetic pole with a plane parallel to rotational axis 7a, is denoted by L, as shown in FIG. 2.

The value of L for all the magnetic poles in the circular row is essentially the same.

Figure 4:
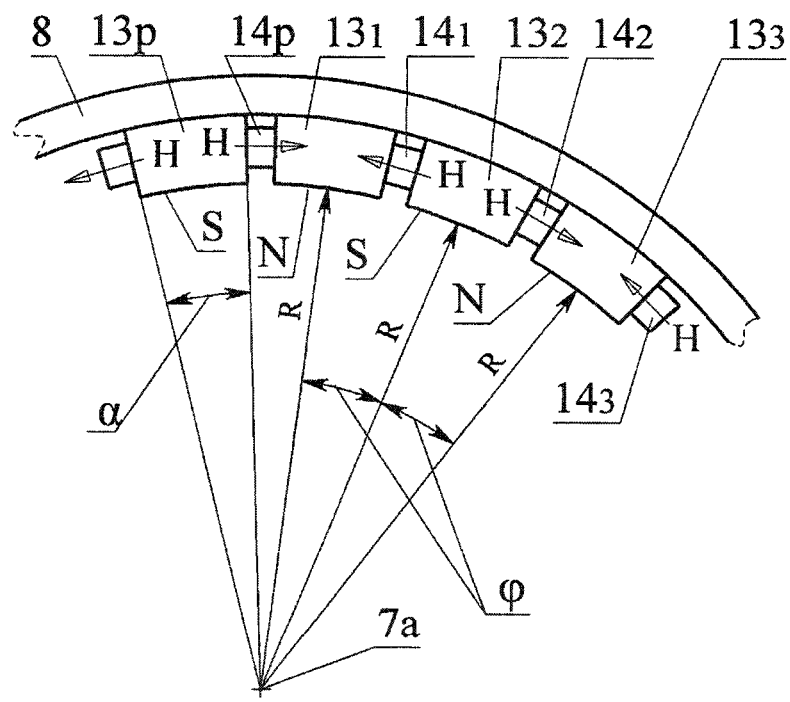
FIG. 4 schematically shows the cross-section of a fragment of the first part in its second implementation in a plane perpendicular to the rotational axis.

The magnetic pole of the first part, as shown in FIG. 4, can be the surface of piece of magnetic material 13, made of soft-magnetic material and positioned on the inner surface of case element 8 in between two permanent magnets 14. The magnetization of the surface of piece of magnetic material 13 is provided by permanent magnets 14 it is positioned between. In this case the first part has as many pieces of magnetic material 13 ($13_1$, $13_2$, $13_3$, ... $13_p$) distributed in a circular row as there are magnetic poles. Similarly, it has as many permanent magnets 14 ($14_1$, $14_2$, $14_3$, ... $14_p$) as there are pieces of magnetic material 13. Each permanent magnet 14 is positioned between two pieces of magnetic material 13 so that two permanent magnets 14 adjacent to each piece of magnetic material 13 are facing it with like poles. The surface of piece of magnetic material 13 facing the radial gap (that is, opposite to the surface facing case element 8) is a magnetic pole of the first part in its second implementation. The magnetic poles are correspondingly denoted as N or S.

When producing the first part in its first implementation it is preferable to use permanent magnets with a high value of magnetic induction, e.g. based on NdFeB (neodymium-iron-boron).

When producing the first part in its second implementation it is preferable to use permanent magnets with a high value of coercive force, e.g. based on SmCo (samarium-cobalt).

Figure 5:
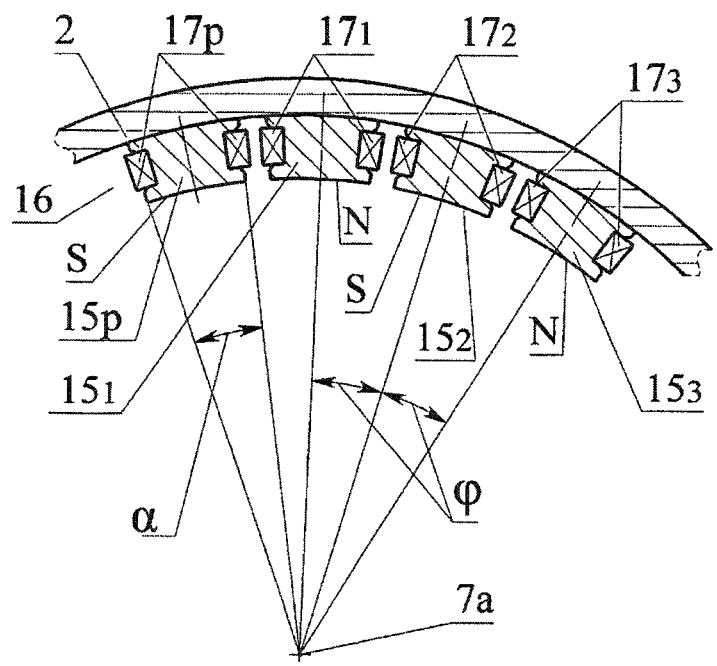
FIG. 5 schematically shows the cross-section of a fragment of the first part in its third implementation in a plane perpendicular to the rotational axis.

If permanent magnets cannot be used in the first part of the electric machine (e.g., at high temperatures) it is advisable to use the third implementation of the first part, shown in FIG. 5.

In this implementation the magnetic pole of the first part is the surface of piece of magnetic material 15 (made of soft-magnetic material) of electromagnet 16, facing the radial gap. The magnetization of piece of magnetic material 15 is provided by a wraparound DC field coil 17. piece of magnetic material 15 is then the core of electromagnet 16. In this case the first part contains as many pieces of magnetic material 15 ($15_1$, $15_2$, $15_3$, ... $15_p$) positioned on the inner surface of circular magnetic conductor 2 and arranged in a circular row as there are magnetic poles (p). Winding 17 contains as many coils ($17_1$, $17_2$, $17_3$, ... $17_p$) as there are pieces of magnetic material 15. In order to alternate the polarity of the magnetic poles the direction of current in each pair of neighboring coils is alternating. In this implementation of the first part, pieces of magnetic material 15 and circular magnetic conductor 2 can be a single part (not shown). The magnetic poles are accordingly denoted as N or S.

Regardless of the implementation of the first part, the magnetic poles are connected into a magnetic circuit.

In the first implementation of the first part, the magnetic circuit comprises the sources of static magnetic flux—permanent magnets 1—and circular magnetic conductor 2 they are situated upon.

In the second implementation of the first part, the magnetic circuit comprises pieces of magnetic material 13, made of soft-magnetic material, and the sources of static magnetic flux—permanent magnets 14—positioned in between them.

In the third implementation of the first part, the magnetic circuit comprises cores 15 of electromagnets 16, which are the sources of static magnetic flux, and circular magnetic conductor 2 they are situated upon.

The centers of all the magnetic poles essentially belong to one and the same circle with its center on rotational axis 7a and of radius R, shown in FIG. 4 for magnetic pole N of piece of magnetic material $13_1$, magnetic pole S of piece of magnetic material $13_2$ and magnetic pole N of piece of magnetic material $13_3$.

The angle between neighboring magnetic poles in the circular row is essentially one and the same (identical) for each pair of the poles.

The angle between magnetic poles is denoted by $\phi$ as shown in FIGS. 3-5.

The angular dimensions of the magnetic poles of the first part are essentially the same and are denoted by $\alpha$ as shown in FIGS. 3-5.

Electromagnets 3 in the second part of the electric machine are identical to each other, with each of them comprising magnetic-force-conducting element 4 and winding 5 (see FIG. 1).

Figure 6:
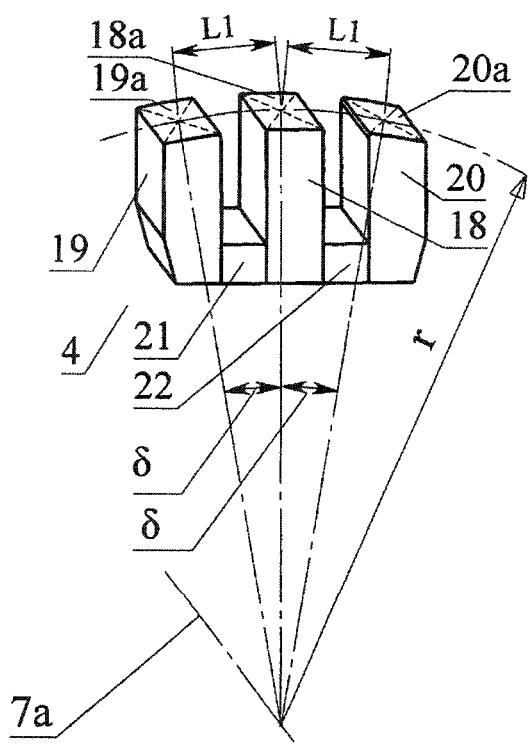
FIG. 6 provides a schematic axonometric view of the magnetic-force-conducting element of the electromagnet.
Figure 7:
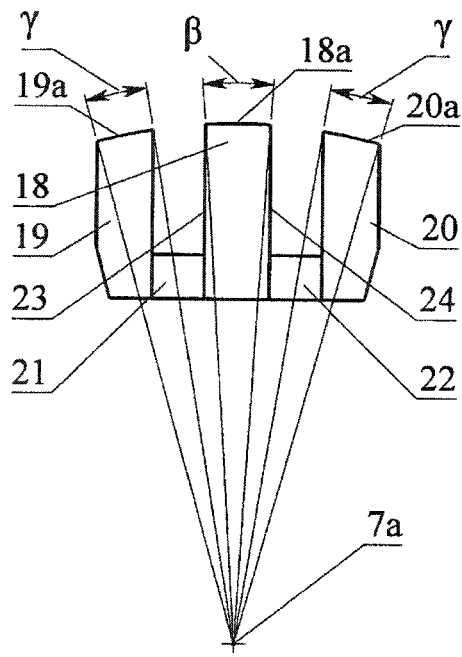
FIG. 7 schematically depicts the cross-section of the magnetic-force-conducting element of the electromagnet in a plane perpendicular to the rotational axis.

As shown in FIGS. 6 and 7, magnetic-force-conducting element 4 of each electromagnet comprises central polar part 18 with polar surface 18a facing the radial gap, two lateral polar parts 19 and 20 with polar surfaces 19a and 20a, respectively, turned towards the radial gap and two linking pieces 21 and 22.

Lateral polar parts 19 and 20 are spaced from opposite sides 23 and 24, respectively, of central polar part 18, peripherally with respect to the direction of the rotational axis (see FIG. 7).

Linking piece 21 is between side 23 of central polar part 18 and the opposing side of lateral polar part 19, while linking piece 22 is between side 24 of central polar part 18 and the opposing side of lateral polar part 20, as shown in FIG. 7.

Central polar part 18 and lateral polar parts 19 and 20 are protruding with respect to linking pieces 21 and 22 on the side of their surfaces facing the radial gap.

Central polar part 18, lateral polar parts 19 and 20 and linking pieces 21 and 22 are rigidly bound to each other and can be manufactured bodily as shown in FIGS. 1 and 2.

Magnetic-force-conducting element 4 can be a laminated core, made of electric-steel wafers, or compressed of ferromagnetic powder.

The centers of polar surfaces 18a, 19a and 20a of magnetic-force-conducting element 4 essentially belong to one circle of radius r with its center on rotational axis 7a (FIG. 6). Lateral polar parts 19 and 20 are spaced from peripherally opposite sides 23 and 24 of central polar part 18 by distance $L_1$ between the centers of adjacent polar surfaces (see FIG. 6).

The angle between polar surfaces 18a and 19a is equal to the angle between polar surfaces 18a and 20a and is denoted by $\delta$ in FIG. 6.

The angular dimension of polar surface 18a of central polar part 18 is denoted as $\beta$ and is chosen depending on the angular dimension a of the magnetic pole. The angular dimensions of polar surfaces 19a and 20a of lateral polar parts 19 and 20, respectively, are essentially equal and are denoted as $\gamma$ in FIG. 7.

Angle $\gamma$ is chosen depending on the value of angle $\beta$.

Figure 8:
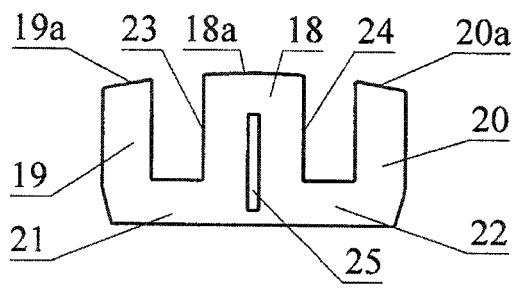
FIG. 8 schematically depicts the cross-section of the magnetic-force-conducting element of the electromagnet, with a groove made as a reach-through hole, in a plane perpendicular to the rotational axis.
Figure 9:
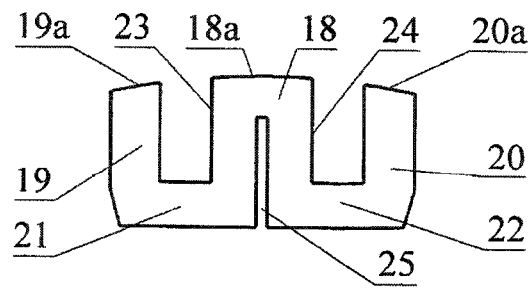
FIG. 9 schematically depicts the cross-section of the magnetic-force-conducting element of the electromagnet, with a groove made as an open cutout, in a plane perpendicular to the rotational axis.

Central polar part 18 of magnetic-force-conducting element 4 can be made with groove 25, as shown in FIGS. 8-9.

As shown in FIG. 8, groove 25 is a hole radially elongated and reach-through in the direction of the rotational axis.

Besides, the groove can be made as a cutout which is reach-through in the direction coinciding with the direction of the rotational axis and is open on the side opposite to the polar surface of the central polar part, as shown in FIG. 9.

Central polar part 18 of magnetic-force-conducting element 4 can have several grooves made as holes or one groove made as a cutout and, at least, one hole (not shown).

In addition, as shown in FIG. 10, if the magnetic-force-conducting element is made as a laminated core, central polar part 18 of magnetic-force-conducting element 4 can have several grooves—all denoted as 25, part of which (marked as 25a) are open on the side opposing the polar surface of the central polar part, whereas the other part (25b) is formed within the body of the central polar part.

Windings 5 of all electromagnets 3 are identical to each other. Each winding, as shown in FIG. 11, is a single coil, wrapping around central polar part 18. Winding 5 is placed on the central polar part, with part of the winding being positioned between the polar parts of the magnetic-force-conducting element.

The lengths of polar surfaces 18a, 19a and 20a of the magnetic-force-conducting element along the axis (i.e., along rotational axis 7a), each measured along the line of intersection of the respective polar surface with a plane parallel to rotational axis 7a, are the same and denoted in FIG. 11b as $L_2$.

The value of L is essentially the same as $L_2$.

Part of winding 5 positioned between the polar parts of the magnetic-force-conducting element consists of two segments, one of which (denoted as 5a) is between central polar part 18 and lateral polar part 19 and the other (denoted as 5b) is between central polar part 18 and lateral polar part 20. The length of each segment along the axis is essentially equal to $L_2$.

The value of $L_2$ is chosen so that part of the winding positioned between the polar parts of the magnetic-force-conducting element is at least half as long the whole winding, because the magnetomotive force of the winding is essentially accounted for by the part of the winding embraced by the magnetic-force-conducting element (that is, positioned between the polar parts of the magnetic-force-conducting element).

In the technical solution being discussed, the required value of the magnetomotive force of the winding is achieved by making the winding of one coil, with the central polar part of magnetic-force-conducting element 4 being the core of electromagnet 3, as it is wrapped around by winding 5.

Figure 12:
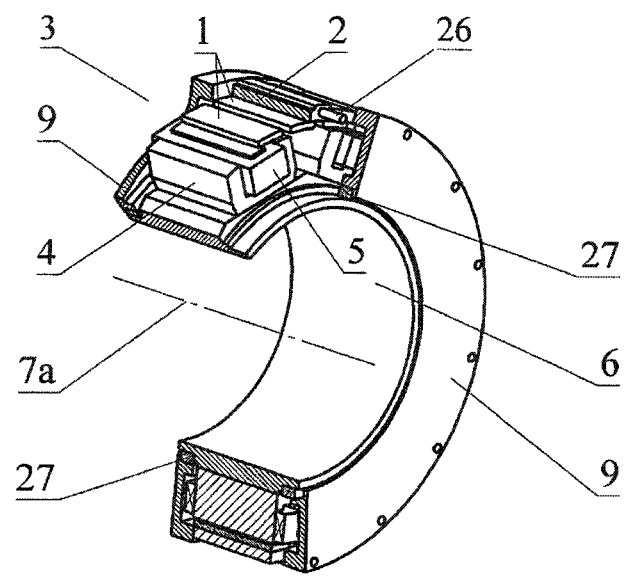
FIG. 12 gives an axonometric view of the first embodiment of the invention without a case element and a shaft.

The instance of the first embodiment shown in FIG. 12 is different from the instance shown in FIG. 2 by that there is no case element or a shaft. Circular magnetic conductor 2 is rigidly bound to lateral support elements 9 by means of double-end bolts 26. Lateral support elements 9 are attached to substructure 6 with sliding bearings 27, which ensures that the first part is co-axial with respect to the second part and can rotate. Such an implementation is advisable in the case large diametral dimensions of the electric machine or when it needs to be mated with another executive device such as the drive of the draw-in gear of a turning machine without using a variable-ratio transmission box.

Such a design is also possible for the second and third implementations of the first part. In the case of the second implementation of the first part in such a design, each body 13 is rigidly bound to lateral support elements 9, for example, by means of double-end bolts (not shown). In the case of the third implementation of the first part in such a design, each core 15 or magnetic conductor 2 are rigidly bound to lateral support elements 9, for example, by means of double-end bolts (not shown).

Besides, the designs of the embodiment of the invention are possible in which there is case element 8 but no shaft 7 or, vice versa, there is shaft 7 but no case element 8 (not shown).

Figure 13:
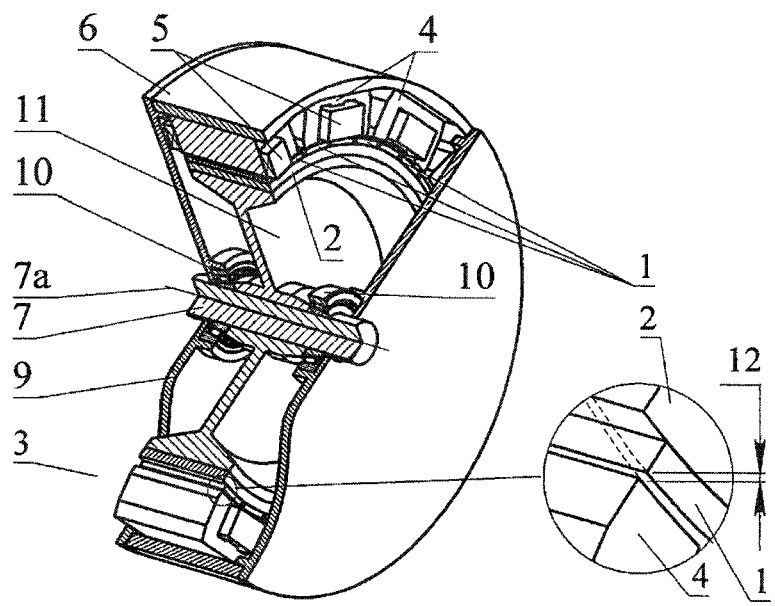
FIG. 13 depicts an axonometric view of the second embodiment of the invention.
Figure 14:
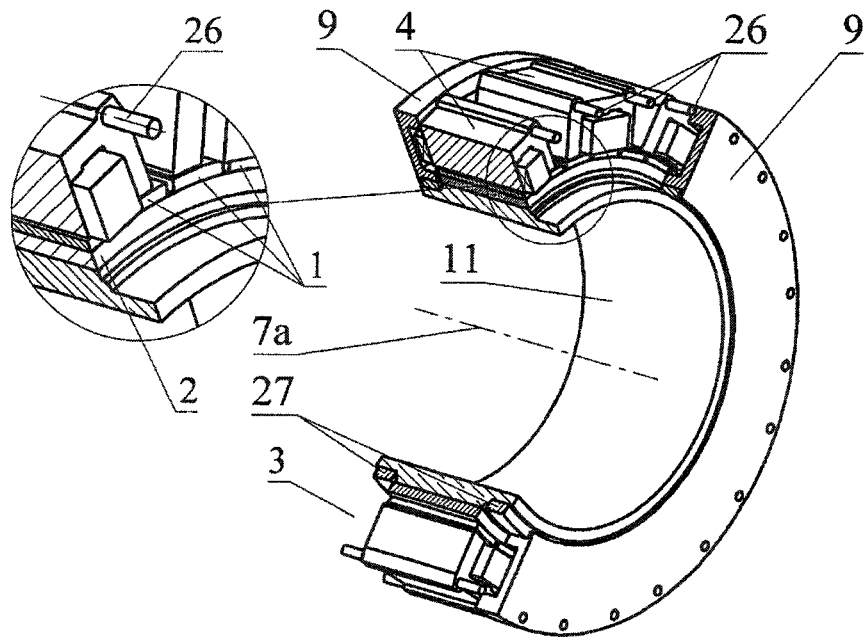
FIG. 14 depicts an axonometric view of the second embodiment of the invention without a case element and a shaft.

The second embodiment of the invention shown in FIGS. 13 and 14, is different from the first embodiment by that the second part wraps around the first part, that is, the circular row of electromagnets 3 embraces the circular row of magnetic poles, which are the surfaces of permanent magnets 1 turned towards radial gap 12.

In the second embodiment of the invention, shown in FIG. 13, substructure 6 embraces circular magnetic conductor 2, which wraps around shaft 7 and is rigidly bound to it by means of auxiliary element 11, made of non-ferromagnetic material.

Permanent magnets 1 (the first implementation of the first part) are placed on the outer surface of circular magnetic conductor 2.

Arranged in a circular row, magnetic-force-conducting elements 4 of electromagnets 3 are positioned upon the inner surface of substructure 6 and are rigidly bound to it. Substructure 6 is rigidly bound with lateral support elements 9, situated on base's butt end sides. Lateral support elements 9 are connected to shaft 7 by means of rolling bearings 10. In this implementation, substructure 6 serves as a case element. One of lateral support elements 9 can be manufactured bodily with substructure 6 (not shown).

The second embodiment of the invention is possible in a design that has no shaft (see FIG. 14), in which case magnetic-force-conducting elements 4 are rigidly bound to lateral support elements 9, for example, by means of double-end bolts 26, while lateral support elements 9 are connected to auxiliary element 11, for example, by means of sliding bearings 27. This ensures that the first part is co-axial to the second part and that they can rotate with respect to each other.

In this case lateral support elements 9 with double-end bolts 26 serve as a substructure.

In each embodiment of the invention t is possible to have a design in which the first part is mounted so as to be able to rotate while the second part is stationary or a design in which the second part can rotate and the first part stays stationary. For example, in the design in FIG. 2 one can fix shaft 7 while leaving case element 8 mobile or one can fix case element 8 leaving shaft 7 able to rotate.

For the design in FIG. 12, it is possible to immobilize lateral support elements 9 leaving substructure 6 mobile or fix substructure 6 with mobile lateral support elements 9. For the design in FIG. 14, it is possible to immobilize lateral support elements 9 leaving auxiliary element 11 mobile or fix auxiliary element 11 with mobile lateral support elements 9.

Figure 15:
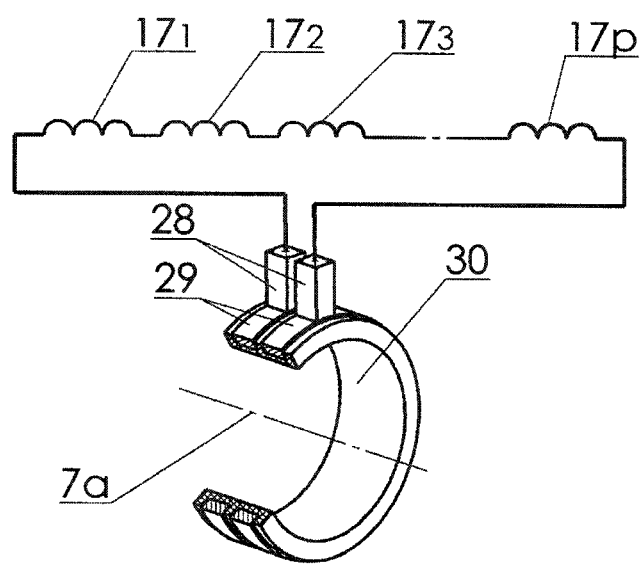
FIG. 15 shows schematically sliding contacts to energize the winding.

In the third implementation of the first part (see FIG. 5) and in designs in which the first part can rotate, the current can be input into field coil 17 by means of sliding contacts which include brushes 28 and current-conducting rings 29, as shown in FIG. 15. Brushes 28 in this case rotate, and current-conducting rings 29, mounted on retention element 30 made of non-conducting material, remain still.

In implementation in which the second part can rotate, the windings of electromagnets 3 can be energized similarly (not shown).

The electric machine can be used as both a generator and a motor in any of the embodiment of the invention described.

The torque of the machine (the torque of the motor or the torque of the generator counteracting the rotational) is created by the force interaction of the magnetic field of each electromagnet with the magnetic field created by the sources of static magnetic field.

As shown in FIG. 11, adjacent polar surfaces 19a and 18a (18a and 20a) of magnetic-force-conducting element 4 magnetize in opposite polarities as an effect of the current flowing through winding 5.

When magnetic-force-conducting element 4 is made without a groove, the magnetic flux generated by segment 5a (5b) of the part of the winding positioned between the polar parts of the magnetic-force-conducting element magnetizes polar surfaces 18a-19a (18a-20a) in opposite polarities and polar surfaces 18a-20a (19a-18a) in the same polarity.

The magnetic flux generated by segment 5a (5b) when passing through polar surface 18a is essentially equal to the difference between the magnetic fluxes passing through polar surfaces 19a and 20a (20a and 19a).

When magnetic-force-conducting element 4 is made with a groove, the magnetic flux generated by segment 5a (5b) of the part of the winding positioned between the polar parts of the magnetic-force-conducting element magnetizes polar surfaces 19a-18a (18a-20a) in opposite polarities, while polar surface 20a (19a) remains essentially non-magnetized, i.e., the magnetic flux generated by segment 5a (5b) when passing through polar surface 18a is essentially the same as when passing through polar surface 19a (20a).

Groove 25 optimizes the flow of magnetic fluxes in the magnetic-force-conducting element and reduces the interference of the segments of the winding positioned between the polar parts of the magnetic-force-conducting element, thus increasing the torque.

As having a groove results in a longer winding and, hence, greater heat losses in it, it is most advisable to have it when the part of the winding between the polar parts is 0.6 of the overall length of the winding or more.

For each instance of the machine, the type of the magnetic-force-conducting element (with or without a groove) as well as the values of angular dimensions $\alpha$, $\beta$ and $\gamma$ and distance $L_1$ ($\delta$) between the centers of adjacent polar surfaces are selected so as to maximize the torque of the electric machine while keeping the mass of electromagnets and the heat losses in windings minimal.

The greatest torque is achieved by the maximum values of magnetic induction in the radial gap when the magnetic flux is concentrated as much as possible on the polar surfaces of the magnetic-force-conducting elements.

In this case the values of angles $\beta$, $\gamma$ and $\delta$ will all be within the ranges selected for all the implementations of the machine.

It has been empirically established that the value of angle $\beta$ (the angular dimension of the polar surface of the central polar part) should be approximately within a range of $0.55\alpha$ to $0.95\alpha$, whereas angle $\gamma$ (the angular dimension of the polar surface of the lateral polar part) should be approximately within a range of $0.55\beta$ to $0.95\beta$.

If central polar part 18 of magnetic-force-conducting element 4 has groove 25, as shown in FIGS. 8-10, angle $\beta$ should preferably be in a range of approximately $0.7\alpha$ to approximately $0.95\alpha$.

If central polar part 18 of magnetic-force-conducting element 4 does not have a groove, as shown in FIGS. 6 and 7, angle $\beta$ can be chosen in a range of approximately $0.55\alpha$ to approximately $0.80\alpha$.

It has also been empirically established that distance $L_1$ between the centers of adjacent polar surfaces should be set so that value of angle $\underline{\delta}$ (the angle between the polar surfaces) belongs to an interval of approximately $0.7\phi$ to approximately $1.3\phi$, where $\phi$ is the angle between the magnetic poles.

In the first implementation of the first part of the machine, value of angle $\delta$ should belong to an interval of approximately $0.7\phi$ to approximately $1.1\phi$.

When the first part of the machine is manufactured in its second or third implementation, angle $\delta$ is chosen from a range of approximately $0.9\phi$ to approximately $1.3\phi$.

The value of angle $\alpha$ (the angular dimension of a magnetic pole) for each instance of the machine is chosen as large as possible, given number p of magnetic poles, and the value of angle $\delta$ should exceed half the sum of angles $\beta$ and $\gamma$ so as to ensure the winding can be placed between the polar parts and provide the required value of the magnetomotive force.

Figure 16:
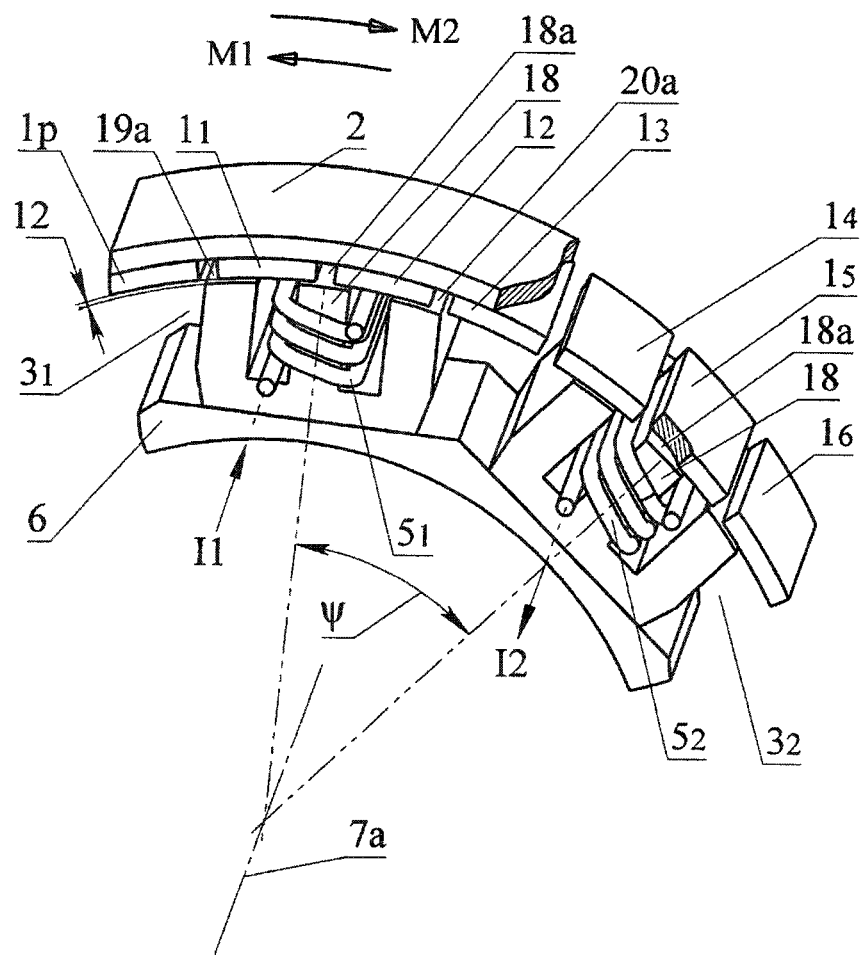
FIG. 16 shows an axonometric view of the fragment of the first embodiment depicted in FIG. 2.

In a circular row of electromagnets, the arrangement of each pair of neighboring electromagnets is dictated by the angle between two planes intersecting along the rotational axis. One of these planes passes through the center of the polar surface of the central polar part of the magnetic-force-conducting element of one of the electromagnets in the pair, and the other passes through the center of the polar surface of the central polar part of the magnetic-force-conducting element of the other electromagnet in the pair. Hereinafter this angle will be called the angle between electromagnets and denoted by $\psi$ as shown in FIG. 16 for neighboring electromagnets 3a and 3b.

Electromagnets 3 in the circular row are spaced from each other so as to largely rule out the interference of magnetic fields. The centers of the polar surfaces of all magnetic-force-conducting elements in this case essentially belong to one and the same circle of radius r.

In order to create continuous torque of the motor (or generator's torque counteracting the rotation), angle $\psi$ should not be a multiple of $\phi$.

When the first or the second part rotates, the magnetic flux in each magnetic-force-conducting element 4 periodically changes its direction, with the period in the rotation angle being $2\phi$, which creates periodic electromotive force (e.m.f.) in each winding 5 with a period of 360 electrical degrees.

The current in the winding is provided either by a voltage from a voltage source (not shown) if the machine operates as a motor or by induced e.m.f. of winding 5 when it is connected to an electrical load (not shown) in the case of the machine operating as a generator.

In order to create the torque in the required direction, the direction of the current flowing in the winding of each electromagnet is set depending on the polarity of two neighboring magnetic polars that the center of the polar surface of the central polar part of the magnetic-force-conducting element is currently in between.

For each embodiment of the invention in which the first part can rotate, in order to create the torque in the required direction, the direction of the current in the mode of a motor is set so that the polar surface of the central polar part is magnetized by the current in the same direction as the polarity of the magnetic pole which is in the same direction from the polar surface as the direction of the torque being created.

For each embodiment of the invention in which the first part can rotate, in order to create the torque in the required direction, the direction of the current in the mode of a motor is set so that the polar surface of the central polar part is magnetized by the current in the same direction as the polarity of the magnetic pole which is in the direction from the polar surface opposite to the direction of the torque being created.

When the machine operates as a generator, the direction of the current flowing in the winding of each electromagnet is determined by the polarities of two adjacent magnetic poles the center of the polar surface of the central polar part of the magnetic-force-conducting element is currently in between and also by the parameters of the electrical load.

In FIG. 16, for the design in which the first part can rotate, the defined direction of torque of the electric machine is indicated with arrow M1 (counterclockwise), and for the design in which the second part can rotate, the defined torque direction is shown by arrow M2 (clockwise).

The magnetic poles of the first part $1_1$, $1_2$, $1_3$, $1_4$ and $1_5$ have polarities S, N, S, N and S, respectively.

The center of polar surface 18a of central polar part 18 of the magnetic-force-conducting element of electromagnet $3_1$ is positioned between the centers of the magnetic poles of permanent magnets $1_1$ and $1_2$.

The center of polar surface 18a of central polar part 18 of the magnetic-force-conducting element of electromagnet $3_2$ is situated between the centers of the magnetic poles of permanent magnets $1_4$ and $1_5$.

As shown in FIG. 16, permanent magnets $1_1$ and $1_4$ are offset counterclockwise with respect to polar surfaces 18a of the magnetic-force-conducting elements of electromagnets $3_1$ and $3_2$, accordingly.

Polar surface 18a of the magnetic-force-conducting element of electromagnet $3_1$ is magnetized in polarity S by the current flowing in winding $5_1$ in the direction indicated in the picture by arrow $I_1$ (from the viewer). Polar surface 18a of the magnetic-force-conducting element of electromagnet $3_2$ is magnetized in polarity N by the current flowing in winding $5_2$ in the direction indicated in the picture by arrow $I_2$ (towards the viewer). The direction of current $I_2$ in winding $5_2$ is opposite to that of current $I_1$ in winding $5_1$.

The force interaction that creates the torque happens when the center of polar surface 18a of the magnetic-force-conducting element of electromagnet $3_1$ ($3_2$) finds itself between the centers of the magnetic poles of permanent magnets $1_1$ and $1_2$ ($1_4$ and $1_5$).

The force interaction does not happen when the center of polar surface 18a of the magnetic-force-conducting elements of electromagnets 3 is opposite the center of a magnetic pole (not shown).

As the polarity of magnetic poles alternates during the rotation, the direction of the current and the current itself in winding 5 of each electromagnet 3 change. In each angular position of the center of the polar surface with respect to the magnetic poles the current in the winding is set so as to minimize the heat losses in the winding, given the required value of the torque of the machine. The current in windings 5 can be controlled with industrial control blocks that allow one to determine the relative position of the first part with respect to the second part and to apply voltage of appropriate phase and value to each of the windings.

An electric motor manufactured according to the first embodiment with the first implementation of the first part has the following characteristics:

| | |
|---|---|
| Maximum power capacity | 6.5 kW |
| Starting torque | 200 Nm |
| Maximum frequency | 700 rpm |
| Mass | 6.2 kg |
| Diameter | 190 mm |
| Axial length | 70 mm |
| Maximum torque/mass ratio | 32 Nm/kg |

The ratio of the torque to the rate of heat losses in the windings is as follows:

| | |
|---|---|
| At the torque of 20 kgm | 9.3 kgm/kW |
| At the torque of 15 kgm | 14.5 kgm/kW |
| At the torque of 7.5 kgm | 35 kgm/kW |

Compared to the prototype, the suggested technical solution in any of its possible designs has the following general and particular distinctive features:

It has 1.5 times greater torque, given the same mass and the same heat losses in the windings;

It has 2 times smaller level of heat losses in the windings, given the same mass and the same torque;

It has 2 times smaller mass, given the same torque and the same heat losses in the windings.

Compared to the prototype, a greater torque is achieved with a smaller value of magnetomotive force in the windings and a smaller level of heat losses. The smaller value of the magnetomotive force in the windings allows one to reduce their mass by reducing the wire section and/or the number of turns. This brings down the ratio of the coil inductance to its active resistance (the time constant) and allows one to step up the frequency of current in the windings and the rotation frequency, thereby increasing the power capacity of the machine itself.

As opposed to the prototype, in which for each particular design the distance between the centers of adjacent polar surfaces is set essentially equal to the distance between the centers of magnetic poles along the axis, in the suggested technical solution for each particular design the distance between the centers of adjacent polar surfaces is chosen from a range of values, which allows one to optimize the distribution of magnetic fluxes in the magnetic-force-conducting element and, given the same mass of the magnetic-force-conducting element as in the prototype, to reduce the mass of the magnetic circuit that couples the magnetic poles by 30-50%.

As opposed to the prototype, in which for each particular design the angular dimension of the polar surface of the lateral polar part is set depending on the angular dimension of the magnetic pole, in the suggested technical solution for each particular design the angular dimension of the polar surface of the lateral polar part is chosen from a range of values, depending on the angular dimension of the polar surface of the central polar part, which makes it possible to further optimize the distribution of magnetic fluxes in the magnetic-force-conducting element.

Besides, the suggested technical solution allows one to optimize the distribution of magnetic fluxes in the magnetic-force-conducting element even further by modifying its shape (with or without a groove).

INDUSTRIAL APPLICABILITY

The design suggested is highly efficient. Also, due to the design philosophy of the magnetic system, the electric machine is characterized by technological simplicity and great reliability.

The electric machine, manufactured according to the first or the second embodiment can be efficiently used as a motor-in-wheel of a vehicle, e.g. a bicycle with electric actuator. Compared to known models, it allows one to increase the payload capacity, the angle of climb and the maximum run.

In devices in which the radial geometrical dimensions are of crucial importance, e.g. in the pump drives in oil wells, it is advisable to use the first implementation with the rotating second part.

In case it is necessary to make such an electric machine with rotating shaft, e.g. for general industrial drives, the most advisable is to use the second embodiment of the invention with the rotating first part.

In practice, modifications and improvements of the electric machine are possible, but they stay within the scope of claims defined in the next section.

What is claimed is:

1. An electrical machine comprising:
a first part;
a second part; and
a radial gap separating the first part and the second part;

wherein
    the first part is positioned around the second part or
    the second part is positioned around the first part;
wherein
    the first part is rotatable around a rotational axis and
        the second part is stationary and coaxial with the first
        part, or
    the second part is rotatable around a rotational axis and
        the first part is stationary and coaxial with the second
        part;
wherein the first part comprises:
    magnetic poles connected into a magnetic circuit and
        positioned in a single circular row so that each pair of
        adjacent magnetic poles in the row has opposite
        polarities; and
    pieces of magnetic material;
    wherein each of the magnetic poles is a radial-gap-facing surface of a respective piece of magnetic material, such that the piece's magnetization has a non-zero component normal to the respective surface;
wherein the second part comprises:
    a non-ferromagnetic substructure; and
    electromagnets positioned separate from each other in a circular row on the non-ferromagnetic substructure;
    wherein each electromagnet comprises a magnetic-force-conducting element and a winding;
        wherein each magnetic-force-conducting element comprises:
            a central polar part and
            two lateral polar parts connected to the central polar part,
                wherein the two lateral polar parts, first and second, are positioned on opposite sides of the central polar part with respect to rotation around the rotational axis in a direction substantially perpendicular to the rotational axis;
                wherein the central polar part comprises a polar surface facing the radial gap;
                wherein each of the lateral polar parts comprises a polar surface facing the radial gap;
                wherein the distance between a center of the polar surface of the central polar part and a center of the polar surface of the first lateral part is the same as the distance between a center of the polar surface of the central polar part and a center of the polar surface of the second lateral part
            wherein a part of the winding is positioned between the polar parts of the magnetic-force-conducting element;
            wherein the winding is positioned on the central polar part of the magnetic-force-conducting element;
            wherein a value of the distance between the centers of adjacent polar surfaces of the magnetic-force-conducting element is such that the angle between two planes intersecting along the rotational axis, one of the planes passing through the center of the polar surface of the central polar part and the other plane passing through the center of the polar surface of the first or second lateral polar part, this angle being the angle between the polar surfaces, is not less than approximately 0.7 times an angle between the magnetic poles in the circular row and is not greater than approximately 1.3 of 1 the angle between the magnetic poles, so that the first lateral polar part, the central polar part, and the second lateral polar part are capable of substantially facing, respectively, three adjacent magnetic poles in the circular row; and
            wherein the magnetic-force-conducting elements are positioned so that any distance between adjacent magnetic-force-conducting elements is greater than the radial gap between the polar surfaces and the magnetic the poles to substantively eliminate interference of magnetic fields generated by the adjacent magnetic-force-conducting elements.

2. The electrical machine of claim 1, wherein an angle between the polar surfaces is not less than approximately 0.7 times an angle between the magnetic poles and is not greater than approximately 1.1 of the angle between the magnetic poles.

3. The electrical machine of claim 1, wherein an angle between the polar surfaces is not less than approximately 0.9 times an angle between the magnetic poles and is not greater than approximately 1.3 of the angle between the magnetic poles.

4. An electrical machine comprising:
    a first part;
    a second part; and
    a radial gap separating the first part and the second part;
    wherein
        the first part is positioned around the second part or
        the second part is positioned around the first part;
    wherein
        the first part is rotatable around a rotational axis and
            the second part is stationary and coaxial with the first part, or
        the second part is rotatable around a rotational axis and
            the first part is stationary and coaxial with the second part;
    wherein the first part comprises:
        magnetic poles connected into a magnetic circuit and positioned in a single circular row so that each pair of adjacent magnetic poles in the row has opposite polarities; and
        pieces of magnetic material;
        wherein each of the magnetic poles is a radial-gap-facing surface of a respective piece of magnetic material, such that the piece's magnetization has a non-zero component normal to the respective surface;
    wherein the second part comprises:
        a non-ferromagnetic substructure; and
        electromagnets positioned separate from each other in a circular row on the non-ferromagnetic substructure;
        wherein each electromagnet comprises a magnetic-force-conducting element and a winding;
            wherein each magnetic-force-conducting element comprises:
                a central polar part and
                two lateral polar parts connected to the central polar part,
                    wherein the two lateral polar parts, first and second, are positioned on opposite sides of the central polar part with respect to rotation around the rotational axis in a direction substantially perpendicular to the rotational axis;
                    wherein the central polar part comprises a polar surface facing the radial gap;
                    wherein each of the lateral polar parts comprises a polar surface facing the radial gap;
                    wherein an angular dimension of the polar surface of the central polar part depends on angular dimensions of the magnetic poles, wherein angular dimensions of the polar surfaces of the lateral polar parts are substantially the same;

wherein the distance between a center of the polar surface of the central polar part and a center of the polar surface of the first lateral part is the same as the distance between a center of the polar surface of the central polar part and a center of the polar surface of the second lateral part wherein a part of the winding is positioned between the polar parts of the magnetic-force-conducting element;

wherein the winding is positioned on the central polar part of the magnetic-force-conducting element;

wherein values of the angular dimensions of the polar surfaces of the lateral polar parts are not less than approximately 0.55 times angular dimensions of the polar surfaces of the central polar parts and are not greater than approximately 0.95 times the angular dimensions of the polar surfaces of the central polar parts;

wherein the angular dimensions of the polar surfaces of the central polar parts is not less than approximately 0.55 times the angular dimensions of the magnetic poles and is not greater than approximately 0.95 times the angular dimensions of the magnetic poles;

wherein the first lateral polar part, the central polar part, and the second lateral polar part are capable of substantially facing, respectively, three adjacent magnetic poles in the circular row; and wherein the magnetic-force-conducting elements are positioned so that any distance between adjacent magnetic-force-conducting elements is greater than the radial gap between the polar surfaces and the magnetic the poles to substantively eliminate interference of magnetic fields generated by the adjacent magnetic-force-conducting elements.

5. The electrical machine of claim 4, wherein the angular dimensions of the polar surfaces of the central polar parts is not less than approximately 0.7 times the angular dimensions of the magnetic poles and is not greater than approximately 0.95 times the angular dimensions of the magnetic poles.

6. The electrical machine of claim 4, wherein the angular dimensions of the polar surfaces of the central polar parts is not less than approximately 0.55 times the angular dimensions of the magnetic poles and is not greater than approximately 0.80 times the angular dimensions of the magnetic poles.

* * * * *